D. R. Allen,
Seat.
No. 109,368.       Patented Nov. 22, 1870.
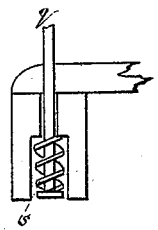
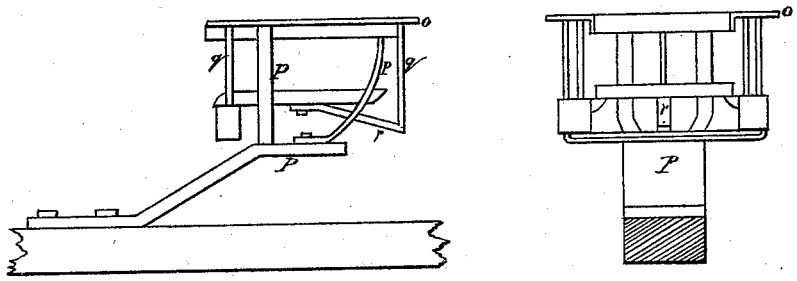

United States Patent Office.

DANIEL R. ALLEN, OF CUMBERLAND, MAINE.

Letters Patent No. 109,368, dated November 22, 1870.

IMPROVEMENT IN SEATS FOR VEHICLES.

The Schedule referred to in these Letters Patent and making part of the same.

*To all whom it may concern:*

Be it known that I, DANIEL R. ALLEN, of Cumberland, in the county of Cumberland and State of Maine, have invented certain new and useful Spring Seat for Agricultural Machines, &c.; and I hereby declare the following to be a full, clear, and exact description thereof, reference being had to the accompanying drawing, in which—

Figure 1 is a side elevation of the seat.
Figure 2 is a front view of the same.
Figure 3 is a detail of mode of applying the spring.

My invention consists of an improved suspended seat for cultivators and other agricultural implements.

Figs. 1 and 2 show front and side views of my improved spring seat.

The general purpose of this is to prevent the injurious results that follow to a person riding on such machines as cultivators.

It can also be very advantageously applied to mowing-machines and horse-rakes, and, in short, to any agricultural machine or vehicle requiring a seat for the rider.

This portion of my invention consists in particular of a seat which is suspended from a support, $o$, which has the necessary standards or posts $p$ $p$ rising from and connected with the body of the vehicle.

From the support $o$ the seat is suspended by the proper connections, $q$ $q$, and is thus arranged and connected in order that any of the oscillations or motions of the frame or vehicle may not effect the person sitting in the seat; for it is plain that the seat will so swing as to keep it in a vertical or nearly vertical position, and thus not oblige the rider to incline the body as the carriage or frame swings or oscillates from side to side, or otherwise.

This motion of agricultural implements, such as cultivators, mowers, &c., is, from the uneven nature of the ground on which they are used, exceedingly painful, in time, and dangerous to health, particularly in the case of mowing-machines, when, from the solid and rigid construction of the machine and action of the cutters, where the seat is rigidly set on the frame, the motion is very great and very pernicious in its effects on the body.

The connections with the support $o$ may, in addition to admitting of the swinging or oscillating motion of the seat, have connected with them or the seat-springs, such as are seen at $r$ $r$, figs. 1 and 2, and at $s$, fig. 3, and the connections may be attached to or united with such springs.

With this arrangement the sudden jolts of the frame or carriage are but little felt by the rider or driver, which motions in the case of heavy solid-framed machines, like mowers, are violent, and in the present structure of the machines wholly unrelieved.

What I claim as my invention, and desire to secure by Letters Patent, is—

A suspended seat for agricultural machines, &c., having the support $o$, the connections $p$ $p$, and with or without the springs $s$ and $r$, as set forth.

Witnesses:                   DANIEL R. ALLEN.
   WM. HENRY CLIFFORD,
   GEORGE E. BIRD.